(12) United States Patent
Chung

(10) Patent No.: US 7,921,233 B2
(45) Date of Patent: Apr. 5, 2011

(54) SIGNAL CONVERTER FOR AN ALL-IN-ONE USB CONNECTOR THAT INCLUDES USB 2.0, USB 3.0 AND ESATA

(75) Inventor: Chen-Yao Chung, Sanchong (TW)

(73) Assignee: Innostar Technology Corporation, Hsinchu (TW)

( * ) Notice: Subject to any disclaimer, the term of this patent is extended or adjusted under 35 U.S.C. 154(b) by 154 days.

(21) Appl. No.: 12/396,606

(22) Filed: Mar. 3, 2009

(65) Prior Publication Data

US 2010/0174835 A1      Jul. 8, 2010

(30) Foreign Application Priority Data

Jan. 8, 2009   (TW) .............................. 98100455 A

(51) Int. Cl.
G06F 3/00        (2006.01)
H01R 25/00     (2006.01)

(52) U.S. Cl. .......................................... 710/15; 439/638
(58) Field of Classification Search ............... 710/15; 439/638
See application file for complete search history.

(56) References Cited

U.S. PATENT DOCUMENTS

| | | | | |
|---|---|---|---|---|
| 7,393,247 B1 * | 7/2008 | Yu et al. | | 439/638 |
| 7,572,146 B1 * | 8/2009 | Chiang | | 439/607.01 |
| 7,600,069 B2 * | 10/2009 | Lin | | 710/315 |
| 7,726,842 B2 * | 6/2010 | Hsieh | | 362/253 |
| 2006/0161716 A1 * | 7/2006 | Lin | | 710/313 |
| 2007/0300006 A1 * | 12/2007 | Lin | | 710/315 |
| 2008/0288703 A1 * | 11/2008 | Iyer | | 710/305 |
| 2008/0288782 A1 * | 11/2008 | Iyer | | 713/186 |
| 2008/0318449 A1 * | 12/2008 | Ma et al. | | 439/78 |
| 2009/0019301 A1 * | 1/2009 | Minami | | 713/324 |
| 2009/0210603 A1 * | 8/2009 | Chen et al. | | 710/305 |
| 2009/0323923 A1 * | 12/2009 | Frey | | 379/386 |

* cited by examiner

*Primary Examiner* — Henry W Tsai
*Assistant Examiner* — Hyun Nam
(74) *Attorney, Agent, or Firm* — Alan Kamrath; Kamrath & Associates PA

(57) ABSTRACT

A signal converter is used to connect between an all-in-one USB connector and a PCB and has USB 3.0 and eSATA signal interfaces, an inner communication interface and a processing unit. The processing unit has an identifying and converting procedure. The identifying and converting procedure is periodically executed to detect the USB 3.0 and eSATA signal interfaces in sequence and determine whether a response signal is sent back from one of the USB 3.0 and eSATA signal interfaces. If a determined result is positive, the processing unit bi-directionally converts two different standard signals of the inner communication interface and the one of the USB 3.0 and eSATA signal interfaces that transmitted the response signal. Therefore, the PCB successfully communicates with the external electronic device through the correct port of the all-in-one USB connector.

9 Claims, 4 Drawing Sheets

SIGNAL CONVERTER FOR AN ALL-IN-ONE USB CONNECTOR THAT INCLUDES USB 2.0, USB 3.0 AND ESATA

BACKGROUND OF THE INVENTION

1. Field of the Invention

The present invention relates to a computer signal converter and, more particularly, to a signal converter for an all-in-one USB connector.

2. Description of the Related Art

Different computer connectors are provided for personal and notebook computers and are used to connect corresponding external electronic devices to the personal and notebook computers. In general, current common computer connectors include USB 2.0, USB 3.0, External Serial Advanced Technology Attachment (hereinafter eSATA) connectors and the like. Common computer connectors are compact, but implementing multiple different computer connectors occupies a large space of a computer casing. Therefore, an all-in-one computer connector is proposed.

The USB 2.0 connector has four pins (VBUS, D−, D+, GND), the USB 3.0 connector has nine signal pins (VBUS, D−, D+, GND, RX+, RX−, GND, TX−, TX+) and the eSATA connector has seven signal pins (GND, RX+, RX−, GND, TX−, TX+, GND). An all-in-one computer connector corresponds to USB 3.0 and eSATA connectors. The computer connector has a regulator casing, seven upper signal pins inside the casing, four lower signal pins inside the casing and a separation separating the seven upper signal pins and four lower signal pins. Five of the seven upper signal pins are common pins for the USB 3.0 and eSATA. Four lower signal pins include VBUS, D−, D+, GND and are parts of the USB 3.0 signal pins to transmit USB 2.0 signals. Therefore, the five upper and four lower signal pins will be simultaneously active when a USB 3.0 plug of the external electronic device is connected to the all-in-one computer connector. The seven upper signal pins will be active if an eSATA plug of an external electronic device is connected to the all-in-one connector.

When the all-in-one connector is directly mounted on a main board of the computer, the main board of the computer has to accurately determine which kind of plug is connected to the all-in-one connector. Therefore, the computer polls the USB 3.0 and eSATA signal pins of the all-in-one computer connector. However, USB 3.0 signal pins and eSATA signal pins share common signal pins, so the computer may incorrectly determine which kind of plug is being connected to.

To overcome the shortcomings, the present invention provides a signal converter for an all-in-one USB connector to mitigate or obviate the aforementioned problems.

SUMMARY OF THE INVENTION

An objective of the present invention is to provide a signal converter for an all-in-one USB connector that includes USB 2.0, USB 3.0 and eSATA connected between the main board and the all-in-one USB connector to accurately determine which kind of plug is connected to the all-in-one USB connector.

The signal converter is used to connect between an all-in-one USB connector and a printed circuit board (PCB) and has outer communication interfaces, an inner communication interface and a processing unit. The processing unit has an identifying and converting procedure periodically executed to detect the outer communication interfaces in sequence and determine whether a response signal is sent back from one of the outer communication interfaces. If a determined result is positive, the processing unit bi-directionally converts two different standard signals of the inner communication interface and the outer communication interface that transmits the response signal. Therefore, the PCB successfully communicates with the external electronic device through the correct port of the all-in-one USB connector.

Other objectives, advantages and novel features of the invention will become more apparent from the following detailed description when taken in conjunction with the accompanying drawings.

DETAILED DESCRIPTION OF THE INVENTION

Figure 1:
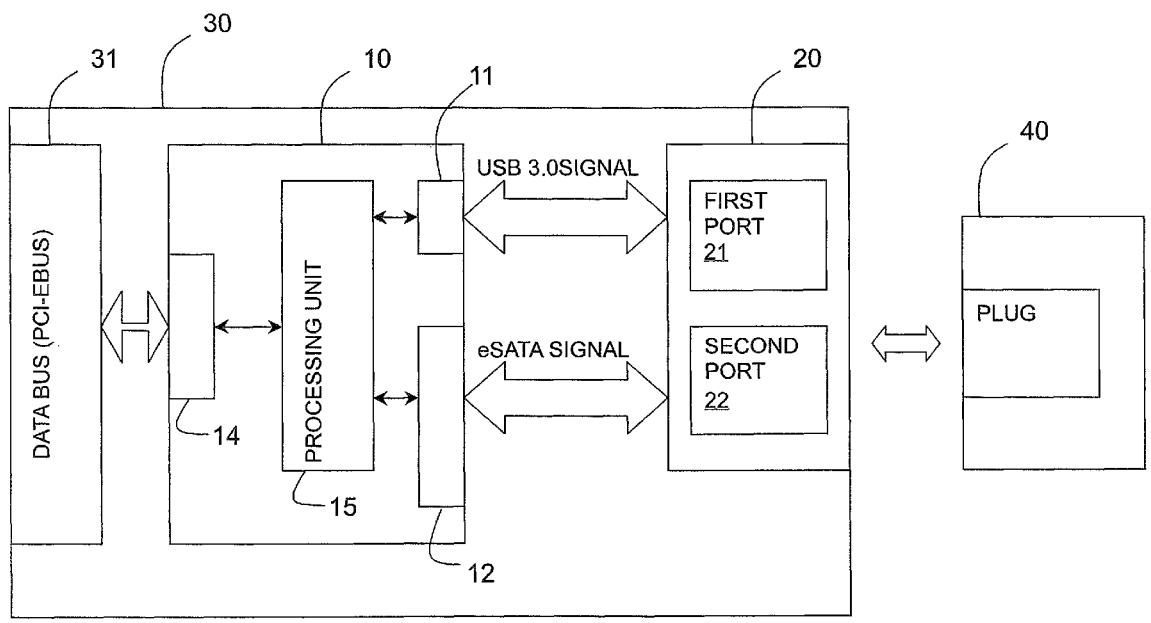
FIG. 1 is a functional block diagram of a signal converter connected between a PCB and all-in-one USB connector for an external electronic device.

With reference to FIG. 1, a preferred embodiment of a signal converter (10) in accordance with the present invention is connected between a PCB (30) and an all-in-one USB connector (20). For example, the PCB (30) may be a main board of a computer or a controlling board of a disk device, such as an HD disk or MP4 disk. The signal converter (10) has multiple interfaces (11, 12), an inner communication interface (14) and a processing unit (15).

The interfaces (11, 12) respectfully receive USB 3.0 and eSATA signals. The USB 3.0 interface (11) is used to connect to nine signal pins of the all-in-one USB connector (20). The eSATA interface (12) is used to connect to the seven signal pins of the all-in-one USB connector (20). In the preferred embodiment, the all-in-one USB connector (20) has a first port (21) and a second port (22). The first port (21) may be a USB 3.0 port or an eSATA port and the second port (22) may be an eSATA port or a USB 3.0 port.

The inner communication interface (14) is used to connect to a signal bus of the PCB (30). In the preferred embodiment, the PCB (30) is the main board and a signal bus (31) of the main board is a PCI-E bus. The inner communication interface (14) complies with the PCI-E standard so the inner communication interface (14) of the preferred embodiment communicates with the PCI-E bus of the PCB (30).

The processing unit (15) is connected between the USB 3.0 and eSATA interfaces (11, 12) and the inner communication interface (14) and has an identifying and converting procedure. The identifying and converting procedure is periodically executed to detect the USB 3.0 and eSATA interfaces (11, 12) in sequence and determine whether a response signal is sent back from one of the USB 3.0 and eSATA interfaces (11, 12). If the determined result is positive, the processing unit (15) converts the USB or eSATA signal to a PCI-E signal and converts the PCI-E signal to the USB or eSATA signal.

Figure 2:
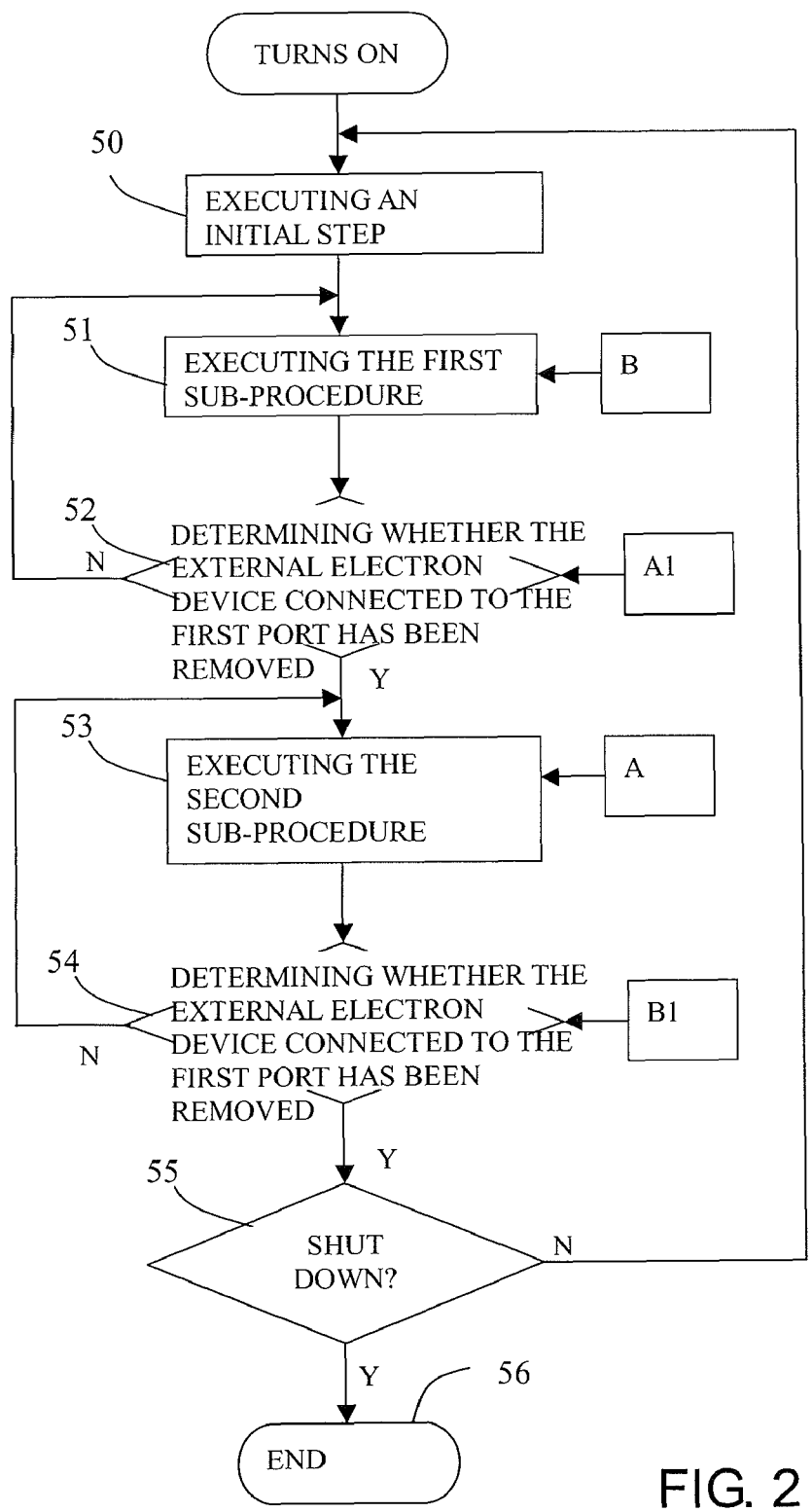
FIG. 2 is a flow chart of an identifying and converting procedure in the signal converter in accordance with the present invention.

With further reference to FIG. 2, the identifying and converting procedure has first and second sub-procedures. When the processing unit (15) is turned on, the processing unit (15) executes an initial step (50) and, then, periodically executes the first and second sub-procedures in sequence. After the initial step (50), the first sub-procedure is executed (51) and determines whether a plug connected to the first port (21) of the all-in-one USB connector (20) has been removed (52). If the determined result is positive, the second sub-procedure will be executed (53) and determines whether a plug connected to the second port of the all-in-one USB connector (20) has been removed (54). If the determined result is positive, the processing unit (15) will further detect whether a shut down signal from the main board is received (55). The processing unit (15) directly ends the identifying and converting procedure (56). If the processing unit (15) does not receive the shut down signal, the processing unit (15) repeats the initial step (50), the first sub-procedure and the second sub-procedure. In another preferred embodiment, the second sub-procedure may be executed (52) before the first sub-procedure (53).

Figure 3:
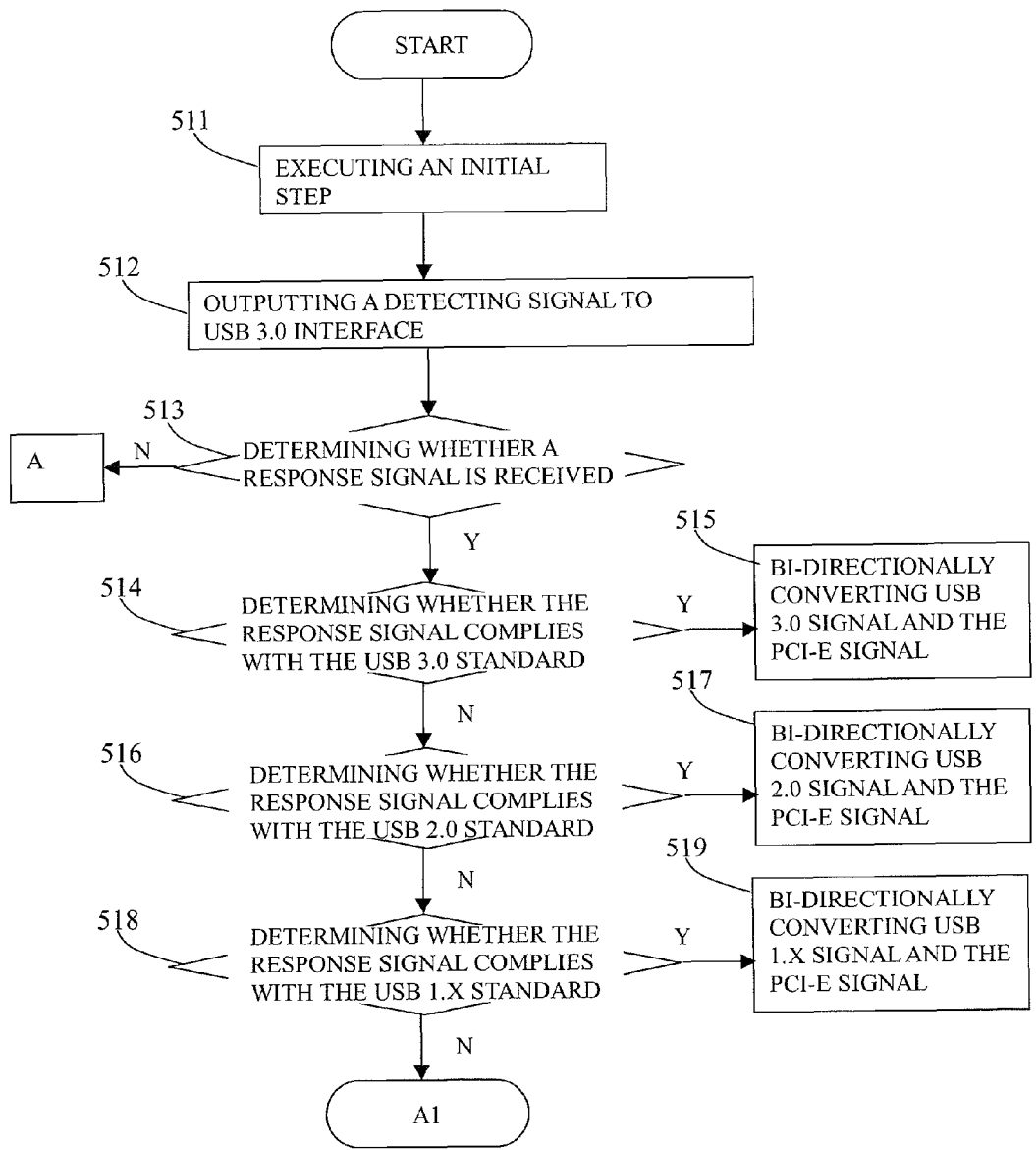
FIG. 3 is a flow chart of a first sub-procedure in the signal converter in accordance with the present invention.

The USB 3.0 signal includes USB 3.0, USB 2.0 and USB 1.X data. With further reference to FIG. 3, the first sub-procedure has acts as follows.

An initial act (511) is firstly executed after the starting acts. A detecting signal is sent to the USB 3.0 port through the first outer communication interface (512). The processing unit (15) further determines whether a response signal is received (513), since the response signal is transmitted to the processing unit (15) when a USB 3.0, USB 2.0 or USB 1.X (USB 1.0, USB 1.1) plug of an external electronic device is connected to the all-in-one USB connector (20). If the determined result is negative, a step A of FIG. 2 is repeated. If the determined result is positive, the processing unit (15) further determines whether the response signal complies with USB 3.0 standard (514). If so, the processing unit (15) converts the PCI-E data to USB 3.0 data and USB 3.0 data to PCI-E data (515). If not, the processing unit (15) further determines whether the response signal complies with the USB 2.0 standard (516). If so, the processing unit (15) converts the PCI-E data to USB 2.0 data and USB 2.0 data to PCI-E data (517). If the response signal does not comply with the USB 2.0 standard, the processing unit (15) further determines whether the response signal complies with the USB 1.X standard (518). If so, the processing unit converts the PCI-E data to USB 1.X data and USB 1.X data to PCI-E data (519). If not, the first sub-procedure is ended, and a step A1 of FIG. 2 is repeated.

Therefore, the main board (30) communicates with the external electronic device (40), the USB 3.0 plug, USB 2.0 or USB 1.X through the signal converter (10) in accordance with the present invention.

The release date for the specification of USB 1.0 is Jan. 15, 1996 by the USB-IF; the release date for the specification of USB 1.1 is Sep. 23, 1998 by the USB-IF; the release date for the specification of USB 2.0 is Apr. 27, 2000 by the USB-IF; the release date for specification of USB 3.0 is Nov. 12, 2008 by the USB-IF; the release date for specification of eSATA in Serial ATA Revision 2.6 is Feb. 15, 2007 by Serial ATA International Organization; the release date for specification of PCI-E v1.0 is Jul. 22, 2002, and the release date for specification of PCI-E v2.0 is Dec. 20, 2006.

Figure 4:
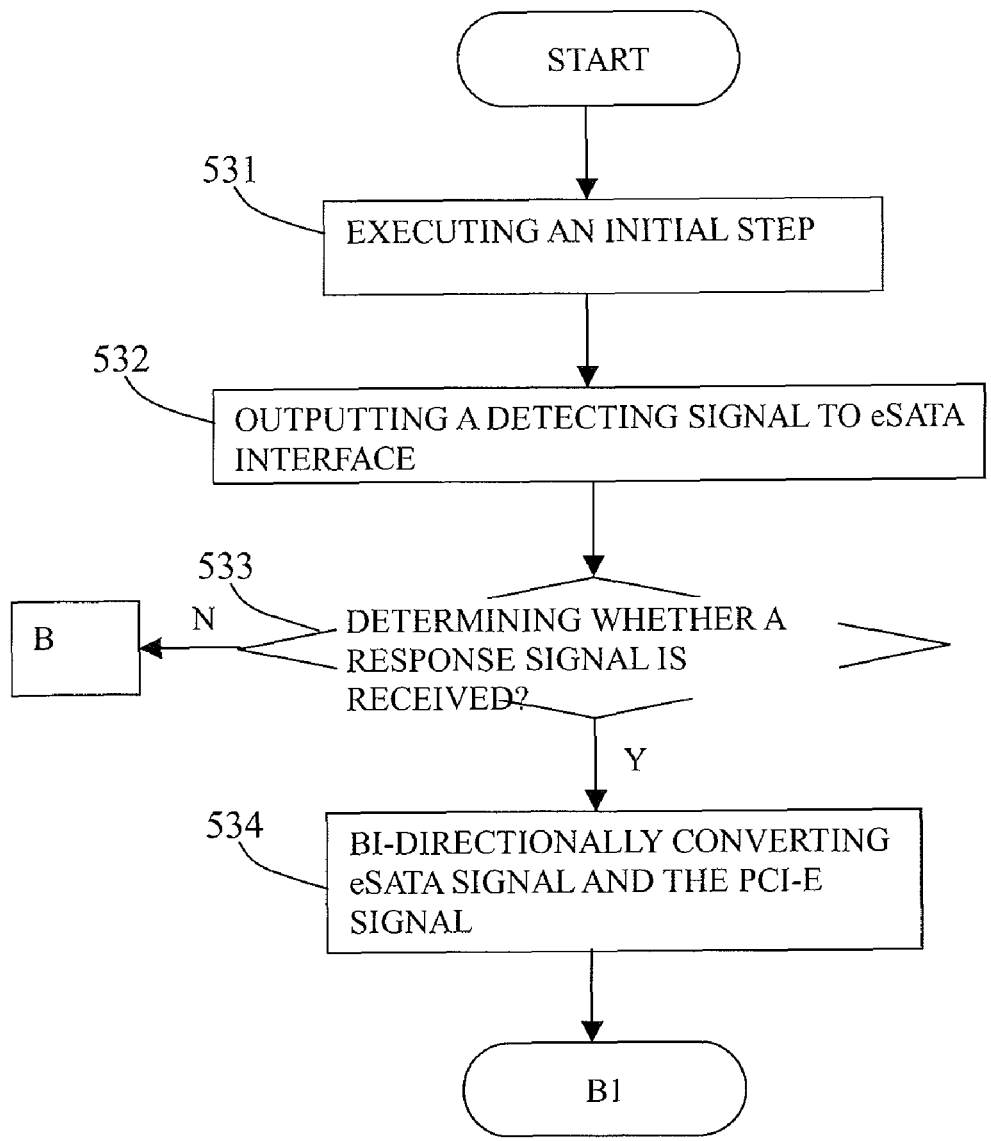
FIG. 4 is a flow chart of a second sub-procedure in the signal converter in accordance with the present invention.

With further reference to FIG. 4, the second sub-procedure has acts as follows.

An initial act is firstly executed after the starting acts (531). A detecting signal is sent to the eSATA port (22) through the second outer communication interface (532). The processing unit (15) further determines whether a response signal is received (533), since the response signal is transmitted to the processing unit (15) when an eSATA plug of an external electronic device (40) is connected to the all-in-one USB connector (20). If the determined result is negative, a step B of FIG. 2 is repeated. If the determined result is positive, the processing unit converts the PCI-E data to eSATA data and eSATA data to PCI-E data (534). Then, step B1 of FIG. 2 is repeated. Therefore, the main board (30) communicates with the external electronic device (40) with the eSATA plug through the signal converter (10) in accordance with the present invention.

In another preferred embodiment, the first outer communication interface is the eSATA interface and the second outer communication interface is the USB 3.0 interface, so the second sub-procedure is executed before the first sub-procedure.

Based on the foregoing description, the signal converter is applied for an all-in-one USB connector having a USB 3.0 port and an eSATA port. When the processing unit is turned on or determines that the external electronic device has been removed, the processing unit periodically detects whether any response signal from the corresponding outer communication interface is received. If so, the outer communication interface that transmits the response signal has been connected to an external electronic device. For example, the signal converter accurately determines a USB plug of the external electronic device has been connected to the first USB 3.0 port through the first outer communication interface. The signal converter further determines the USB standard (USB 3.0, USB 2.0, or USB 1.X) with which the present USB plug of the external electronic device complies. When the second sub-procedure is executing and the eSATA port of the external electronic device is connected to the all-in-one USB connector, the signal converter does not receive the response signal. Therefore, the signal converter does not determine the eSATA plug of the external electronic device is a USB plug. On the contrary, when the first sub-procedure is executed and the eSATA plug of the external electronic device is connected to the all-in-one USB connector, the signal converter receives an incorrect response signal. Therefore, the signal converter does not determine the eSATA plug of the external electronic device is a USB plug.

When the main board of the computer or the controlling board of the disk device uses the signal converter in accordance with the present invention, the main board or the controlling board successfully communicates with different signal standard plugs of the external electronic device.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A signal converter for an all-in-one USB connector comprising:

the all-in-one USB connector including a first port and a second port;

a USB 3.0 signal interface and eSATA signal interface respectively connected to the first port and the second port; and wherein the USB 3.0 signal interface and eSATA signal interface are also configurable to be respectively connected to the second port and the first port;

an inner communication interface connected to a data bus of a printed circuit board (PCB); and a processing unit connected between the USB 3.0 and eSATA signal interfaces and the inner communication interface and having an identifying and converting procedure, wherein the identifying and converting procedure has a first sub-procedure and a second sub-procedure, and wherein the processing unit periodically executes the first and second sub-procedures after the processing unit is actuated to detect the USB 3.0 and eSATA signal interfaces in sequence and determine whether a response signal is sent back from one of the USB 3.0 and eSATA signal interfaces.

when a determined result is positive, the processing unit bi-directionally converts two different standard signals of the inner communication interface and one of the USB 3.0 and eSATA signal interfaces that transmitted the response signal.

2. The signal converter as claimed in claim 1, wherein the first sub-procedure comprises:
   executing an initial step;
   outputting a detecting signal to a first of the USB 3.0 and eSATA signal interfaces;
   determining whether the response signal is received, wherein if a determined result is negative, the second sub-procedure will be executed, but if the determined result is positive, the processing unit bi-directionally converts two different standard signals of the inner communication interface and the one of the USB 3.0 and eSATA signal interfaces that transmitted the response signal; and
   executing the second sub-procedure after an external electric device connected to the all-in-one USB connector is removed.

3. The signal converter as claimed in claim 2, wherein the second sub-procedure comprises:
   executing an initial step;
   outputting a detecting signal to a second of the USB 3.0 and eSATA signal interfaces;
   determining whether the response signal is received, wherein if a determined result is negative, the first sub-procedure will be executed, but if the determined result is positive, the processing unit bi-directionally converts two different standard signals of the inner communication interface and the second of the USB 3.0 and eSATA signal interfaces that transmitted the response signal; and
   executing the first sub-procedure after the external electric device connected to the all-in-one USB connector is removed.

4. The signal converter as claimed in claim 3, wherein the first of the USB 3.0 and eSATA signal interfaces in the first sub-procedure is a USB 3.0 interface and the second of the USB 3.0 and eSATA signal interfaces in the second sub-procedure is an eSATA interface.

5. The signal converter as claimed in claim 4, wherein determining whether the response signal is received in the first sub-procedure further comprises:
   determining whether the response signal complies with a USB 3.0 standard, wherein if a determined result is positive, the processing unit bi-directionally converts two different standard signals of the inner communication interface and the USB 3.0 signal interface;
   determining whether the response signal complies with a USB 2.0 standard, if a determined result is positive, the processing unit bi-directionally converts two different standard signals of the inner communication interface and a USB 2.0 signal interface; and
   determining whether the response signal complies with a USB 1.X standard, wherein if a determined result is positive, the processing unit bi-directionally converts two different standard signals of the inner communication interface and a USB 1.X interface, but if the determined result is negative, the act of executing the second sub-procedure is executed after the external electric device connected to the all-in-one USB connector is removed, wherein USB 1.X includes USB 1.0 and includes USB 1.1.

6. The signal converter as claimed in claim 3, wherein the second of the USB 3.0 and eSATA signal interfaces in the second sub-procedure is a USB 3.0 interface and the first of the USB 3.0 and eSATA signal interfaces in the first sub-procedure is an eSATA interface.

7. The signal converter as claimed in claim 6, wherein the determining whether the response signal is received of the second sub-procedure further comprises:
   determining whether the response signal complies with a USB 3.0 standard; wherein if a determined result is positive, the processing unit bi-directionally converts two different standard signals of the inner communication interface and the USB 3.0 signal interface;
   determining whether the response signal complies with a USB 2.0 standard, if a determined result is positive, the processing unit bi-directionally converts two different standard signals of the inner communication interface and a USB 2.0 signal interface;
   determining whether the response signal is fulfilled with a USB 1.X standard, wherein if a determined result is positive, the processing unit bi-directionally converts two different standard signals of the inner communication interface and a USB 1.X interface, but if the determined result is negative, the act of executing the first sub-procedure is executed after the external electric device connected to the all-in-one USB connector is removed, wherein USB 1.X includes USB 1.0 and includes USB 1.1.

8. The signal converter as claimed in claim 5, further comprising an interface complying with a PCI-E standard.

9. The signal converter as claimed in claim 7, further comprising an interface complying with a PCI-E standard.

* * * * *

UNITED STATES PATENT AND TRADEMARK OFFICE
CERTIFICATE OF CORRECTION

| | | |
|---|---|---|
| PATENT NO. | : 7,921,233 B2 | Page 1 of 1 |
| APPLICATION NO. | : 12/396606 | |
| DATED | : April 5, 2011 | |
| INVENTOR(S) | : Chen-Yao Chung | |

It is certified that error appears in the above-identified patent and that said Letters Patent is hereby corrected as shown below:

Title page, item (73), cancel "Innostar" and substitute therefore --Innostor--.

Signed and Sealed this
Ninth Day of August, 2011

David J. Kappos
*Director of the United States Patent and Trademark Office*